United States Patent [19]

Vickers et al.

[11] 4,425,301
[45] Jan. 10, 1984

[54] FLUID CATALYST REGENERATION APPARATUS

[75] Inventors: Anthony G. Vickers, Arlington Heights; Harold U. Hammershaimb, Western Springs; Charles L. Hemler, Jr., Mt. Prospect, all of Ill.

[73] Assignee: UOP Inc., Des Plaines, Ill.

[21] Appl. No.: 439,090

[22] Filed: Nov. 3, 1982

Related U.S. Application Data

[62] Division of Ser. No. 289,571, Aug. 3, 1981, Pat. No. 4,374,750.

[51] Int. Cl.³ .............. C10G 11/18; B01J 21/20; B01J 29/38; B01J 8/26
[52] U.S. Cl. ..................... 422/111; 208/164; 208/DIG. 1; 422/109; 422/144; 422/146; 502/45
[58] Field of Search .............. 208/DIG. 1, 164; 422/144, 109, 110, 111, 146; 252/417, 419

[56] References Cited

U.S. PATENT DOCUMENTS

| | | | |
|---|---|---|---|
| 2,377,657 | 6/1945 | Watts | 252/417 |
| 2,439,811 | 4/1948 | Jewell | 252/417 |
| 2,492,948 | 1/1950 | Berger | 252/417 |
| 2,506,123 | 5/1950 | Watson . | |
| 2,515,156 | 7/1950 | Jahnig et al. . | |
| 2,596,748 | 5/1952 | Watson et al. | 252/417 |
| 2,735,802 | 2/1956 | Jahnig | 422/144 |
| 2,819,951 | 1/1958 | Medlin et al. . | |
| 2,862,798 | 12/1958 | McKinney . | |
| 2,873,175 | 2/1959 | Owens . | |
| 2,970,117 | 1/1961 | Harper | 252/417 |
| 3,351,548 | 11/1967 | Payne et al. | 208/120 |
| 3,893,812 | 7/1975 | Conner et al. . | |
| 3,898,050 | 8/1975 | Strother . | |
| 3,953,175 | 4/1976 | Pulak . | |
| 3,990,992 | 11/1976 | McKinney | 252/417 |
| 4,032,299 | 6/1977 | Pulak . | |
| 4,035,284 | 6/1977 | Gross et al. | 208/120 |
| 4,065,269 | 12/1977 | Pulak . | |
| 4,167,492 | 9/1979 | Varady | 252/417 |
| 4,197,189 | 4/1980 | Thompson et al. | 208/164 |
| 4,211,637 | 7/1980 | Gross et al. | 208/164 |
| 4,219,442 | 8/1980 | Vickers | 252/417 |
| 4,243,634 | 1/1981 | Vickers | 422/144 |
| 4,283,273 | 8/1981 | Owen | 252/417 |

Primary Examiner—Barry S. Richman
Attorney, Agent, or Firm—James R. Hoatson, Jr.; Louis A. Morris; William H. Page, II

[57] ABSTRACT

A catalyst regeneration process and apparatus for the oxidative removal of coke from a coke contaminated fluid catalyst. The process comprises a high temperature coke combustion zone, a catalyst disengagement zone and an external heat removal zone. A mixture of coke contaminated catalyst, oxygen containing gas, hot regenerated catalyst and cool regenerated catalyst from the heat removal zone are contacted in the high temperature combustion zone, the temperature of which is controlled by adjusting the rate at which catalyst is recycled from the heat removal zone. The temperature of the catalyst-gas mixture is controlled by adjusting the rate at which hot catalyst is recycled from the disengagement zone.

6 Claims, 2 Drawing Figures

FLUID CATALYST REGENERATION APPARATUS

CROSS REFERENCE TO RELATED APPLICATION

This is a division of application Ser. No. 289,571 filed Aug. 3, 1981 and issued as U.S. Pat. No. 4,374,750 on Feb. 22, 1983.

BACKGROUND OF THE INVENTION

The field of art to which this invention pertains to fluid catalyst regeneration. It relates to the rejuvenation of particulated-solid, fluidizable catalyst which has been contaminated by the deposition thereupon of coke. The present invention will be most useful in a process for regenerating coke-contaminated fluid cracking catalyst, but it should find use in any process in which coke is burned from a solid, particulated, fluidizable catalyst.

DESCRIPTION OF THE PRIOR ART

The fluid catalytic cracking process (hereinafter FCC) has been extensively relied upon for the conversion of starting materials, such as vacuum gas oils, and other relatively heavy oils, into lighter and more valuable products. FCC involves the contact in a reaction zone of the starting material, whether it be vacuum gas oil or another oil, with a finely divided, or particulated, solid, catalytic material which behaves as a fluid when mixed with a gas or vapor. This material possesses the ability to catalyze the cracking reaction, and in so acting it is deposited with coke, a by-product of the cracking reaction. Coke is comprised of hydrogen, carbon and other material such as sulfur, and it interferes with the catalytic activity of FCC catalysts. Facilities for the removal of coke from FCC catalysts, so called regeneration facilities or regenerators, are an integral portion of an FCC unit. Regenerators contact the coke-contaminated catalyst with an oxygen-containing gas at conditions such that the coke is oxidized and a considerable amount of heat is released. A portion of this heat escapes the regenerator with flue gas, comprised of excess regeneration gas and the gaseous products of coke oxidation, and the balance of the heat leaves the regenerator with the regenerated, or relatively coke-free, catalyst. Regenerators operating at superatmospheric pressures are often fitted with energy-recovery turbines which expand the flue gas as it escapes from the regenerator and recover a portion of the energy liberated in the expansion.

The fluidized catalyst is continuously circulated from the reaction zone to the regeneration zone and then again to the reaction zone. The fluid catalyst, as well as providing catalytic action, acts as a vehicle for the transfer of heat from zone to zone. Catalyst exiting the reaction zone is spoken of as being "spent", that is partially deactivated by the deposition of coke upon the catalyst. Catalyst from which coke has been substantially removed is spoken of as "regenerated catalyst".

The rate of conversion of the feedstock within the reaction zone is controlled by regulation of the temperature, activity of catalyst and quantity of catalyst (i.e. catalyst to oil ratio) therein. If it is desired to increase the conversion rate, an increase in the rate of flow of circulating fluid catalyst from the regenerator to the reactor can be effected. Inasmuch as the temperature within the regeneration zone under normal operations is invariably higher than the temperature within the reaction zone, this increase in influx of catalyst from the hotter regeneration zone to the cooler reaction zone effects an increase in reaction zone temperature. It is interesting to note that this higher catalyst circulation rate is sustainable by virtue of the system being a closed circuit; and, the higher reactor temperature is sustainable by virtue of the fact that increased reactor temperatures and increased catalyst circulation, once effected, produce an increase in the amount of coke being formed in the reaction and deposited upon the catalyst. This increased production of coke, which coke is deposited upon the fluid catalyst within the reactor, provides, upon its oxidation within the regenerator, an increased evolution of heat. It is this increased heat evolved within the regeneration zone which, when conducted with the catalyst to the reaction zone, sustains the higher reactor temperature operation.

Recently, politico-economic restraints which have been put upon the traditional lines of supply of crude oil have made necessary the use, as starting materials in FCC units, of heavier-than-normal oils. FCC units must now cope with feedstocks such as residual oils and in the future may require the use of mixtures of heavy oils with coal or shale derived feeds.

The chemical nature and molecular structure of the feed to the FCC unit will affect that level of coke on spent catalyst. Generally speaking, the higher the molecular weight, the higher the Conradson carbon, the higher the heptane insolubles, and the higher the carbon to hydrogen ratio, the higher will be the coke level on the spent catalyst. Also high levels of combined nitrogen, such as found in shale derived oils, will also increase the coke level on spent catalyst. The processing of heavier and heavier feedstocks, and particularly the processing of deasphalted oils, or direct processing of atmospheric bottoms from a crude unit, commonly referred to as reduced crude, does cause an increase in all or some of these factors and does therefore cause an increase in coke level on spent catalyst.

This increase in coke on spent catalyst results in a larger amount of coke burnt in the regenerator per pound of catalyst circulated. Heat is removed from the regenerator in conventional FCC units in the flue gas and principally in the hot regenerated catalyst stream. An increase in the level of coke on spent catalyst will increase the temperature difference between the reactor and the regenerator, and in the regenerated catalyst temperature. A reduction in the amount of catalyst circulated is therefore necessary in order to maintain the same reactor temperature. However, this lower catalyst circulation rate required by the higher temperature difference between the reactor and the regenerator will result in a fall in conversion, making it necessary to operate with a higher reactor temperature in order to maintain conversion at the desired level. This will cause a change in yield structure which may or may not be desirable, depending on what products are required from the process. Also there are limitations to the temperatures that can be tolerated by FCC catalyst without there being a substantial detrimental effect on catalyst activity. Generally, with commonly available modern FCC catalyst, temperatures of regenerated catalyst are usually maintained below 1350° F., since loss of activity would be very severe about 1400°–1450° F. If a relatively common reduced crude such as that derived from Light Arabian crude oil were charged to a conventional FCC unit, and operated at a temperature required for high conversion to lighter products, i.e. similar to that for a gas oil charge, the regenerator temperature would operate in the range of 1600°–1800° F. This would be too high a temperature for the catalyst, require very expensive materials of construction, and give an extremely low catalyst circulation rate. It is therefore accepted that when materials are processed that would give excessive regenerator temperatures, a means must be provided for removing heat from the regenerator, which enables a lower regenerator temperature, and a lower temperature difference between the reactor and the regenerator.

A common prior art method of heat removal provides coolant-filled coils within the regenerator, which coils are in contact either with the catalyst from which coke is being removed or with the flue gas just prior to the flue gas' exit from the regenerator. For example, Medlin et al U.S. Pat. No. 2,819,951, McKinney U.S. Pat. No. 3,990,992, and Vickers U.S. Pat. No. 4,219,442 disclose fluid catalytic cracking processes using dual zone regenerators with cooling coils mounted in the second zone. These cooling coils must always be filled with coolant and thus be removing heat from the regenerator, even during start-up when such removal is particularly undesired, because the typical metallurgy of the coils is such that the coils would be damaged by exposure to the high regenerator temperatures (up to 1350° F.) without coolant serving to keep them relatively cool. The second zone is also for catalyst disengagement prior to passing the flue gas from the system, and contains catalyst in a dense phase (Medlin et al and Vickers) or in a dilute phase (McKinney). Coolant flowing through the coils absorbs heat and removes it from the regenerator.

The prior art is also replete with disclosures of FCC processes which utilize dense or dilute phase regenerated fluid catalyst heat removal zones or heat exchangers that are remote from and external to the regenerator vessel to cool hot regenerated catalysts for return to the regenerator. Examples of such disclosures are as set forth in Harper U.S. Pat. No. 2,970,117; Owens U.S. Pat. No. 2,873,175; McKinney U.S. Pat. No. 2,862,798; Watson et al U.S. Pat. No. 2,596,748; Jahnig et al U.S. Pat. No. 2,515,156, Berger U.S. Pat. No. 2,492,948; and Watson U.S. Pat. No. 2,506,123. At least one of the above U.S. patents (Harper) discloses that the rate of return of the cooled catalyst to the regenerator may be controlled by the regenerator (dense catalyst phase) temperature.

Like the basic concept of heat removal from FCC regenerators, the basic concept of internal and external recycle of catalyst particles in FCC regenerators is not, per se, novel. Examples of such concepts in which hot regenerated catalyst is recycled back to a combustion zone are taught in Vickers U.S. Pat. No. 4,219,442, Gross et al U.S. Pat. Nos. 4,211,637 and 4,035,284; Varady U.S. Pat. No. 4,167,492; Pulak U.S. Pat. No. 3,953,175; Strother U.S. Pat. No. 3,898,050; Conner et al U.S. Pat. No. 3,893,812; Pulak U.S. Pat. No. 4,032,299; Pulak U.S. Pat. No. 4,033,728; and Pulak U.S. Pat. No. 4,065,269. At least two of these U.S. patents (Vickers U.S. Pat. No. 4,219,442 and Gross et al 4,211,637) discloses that the rate of the hot regenerated catalyst to the combustion zone may be controlled by the regenerator temperature.

None of the above mentioned references, however, discloses the unique combination of the present invention comprising a coke contaminated fluid catalyst regenerator with a dilute phase combustion zone, a disengagement zone, a remote catalyst cooler and both cool regenerated catalyst and hot regenerated catalyst recycle which may be controlled in response to combustion zone and combustion zone inlet conduit temperatures. It is this combination that achieves a flexibility and efficiency of operation that is not realized by any of the prior art processes.

SUMMARY OF THE INVENTION

Accordingly, the invention is, in one embodiment, a process for regenerating a coke contaminated fluid catalyst. The process includes the steps of: (a) introducing oxygen containing regeneration gas, coke contaminated fluid catalyst, and cool recycled regenerated catalyst and hot recycled regenerated catalyst from sources hereinafter described, into a lower locus of a dilute phase combustion zone maintained at a temperature sufficient for coke oxidation and therein oxidizing coke to produce hot regenerated catalyst and hot flue gas; (b) transporting the hot flue gas and the hot regenerated catalyst from an upper locus of the combustion zone into a regenerated catalyst disengaging zone, wherein the hot regenerated catalyst is separated from the flue gas; (c) transporting a first portion of the hot regenerated catalyst from the disengaging zone to a cooling zone separate from the disengaging zone wherein heat is withdrawn from the hot regenerated catalyst to produce cool regenerated catalyst; (d) withdrawing the cool regenerated catalyst from the cooling zone and transporting it into the mixing zone as the cool recycled regenerated catalyst; and (e) transporting a second portion of the hot regenerated catalyst from the disengaging zone into the mixing zone as the hot recycled regenerated catalyst.

In a second embodiment, the invention is an apparatus for regenerating a coke contaminated, fluid catalyst which apparatus comprises in combination: (a) a vertically oriented combustion chamber; (b) an inlet conduit for regeneration gas connecting with the lower portion of the combustion chamber; (c) a disengagement chamber located superadjacent to and above the combustion chamber and in communication therewith; (d) a catalyst collection portion at the bottom of the disengagement chamber; (e) a heat exchanger, remote from the combustion and disengagement chamber, having a catalyst inlet and outlet; (f) heat removal means disposed within the heat exchanger; (g) a first catalyst recycle conduit connecting the bottom catalyst collection portion of the disengagement chamber with the heat exchanger inlet, such that hot regenerated catalyst can pass from the disengagement chamber to the heat exchanger; (h) a heat exchanger catalyst discharge conduit connecting the catalyst outlet of the heat exchanger with the mixing conduit, such that cooled catalyst can pass from the heat exchanger to the mixing conduit; and (i) a second catalyst recycle conduit connecting the bottom catalyst collection portion of the disengagement chamber with the mixing conduit, such that hot regenerated catalyst can pass directly from the disengagement chamber to the mixing conduit.

Other embodiments of the present invention encompass further details such as process streams and the function and arrangement of various components of the apparatus, all of which are hereinafter disclosed in the following discussion of each of these facets of the invention.

The above described drawings are intended to be schematically illustrative of the present invention and not be limitations thereon.

DETAILED DESCRIPTION OF THE INVENTION

The present invention, in its process aspects, consists of steps for the regenerative combustion within a combustion zone of the coke contaminated catalyst from a reaction zone to form hot flue gas and hot regenerated catalyst, disengagement and collection of the hot regenerated catalyst, cooling of a portion of the hot regenerated catalyst within a heat removal zone, using the cooled regenerated catalyst as a heat sink, and the use of portions of hot regenerated catalyst and cooled regenerated catalyst for control of the temperatures of the combustion zone and catalyst and regeneration gas mixture, respectively. As used herein, the term "hot regenerated catalyst" means regenerated catalyst at the temperature leaving the combustion zone, from about 1300° F. to about 1400° F., while the term "cool regenerated catalyst" means regenerated catalyst at the temperature leaving the cooling zone, about 200° F. less than the temperature of the hot regenerated catalyst.

Figure 1:
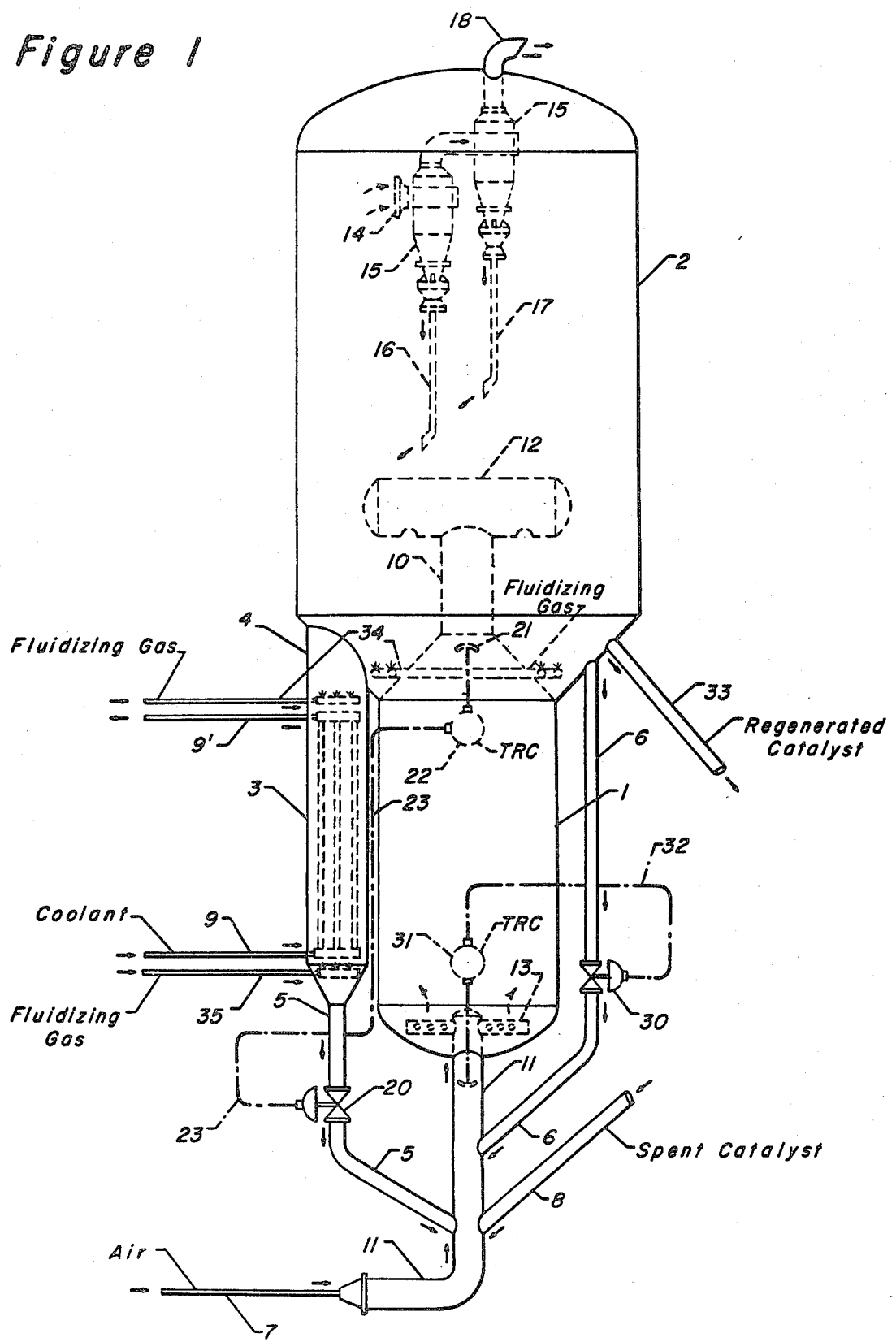
FIG. 1 is a sectional, elevation view of a regeneration apparatus according to the present invention, showing combustion zone 1, disengagement zone 2, falling system cooling zone (heat exchanger) 3, first catalyst recycle conduit 4, heat exchanger catalyst discharge conduit 5, and second catalyst recycle conduit 6.
Figure 2:
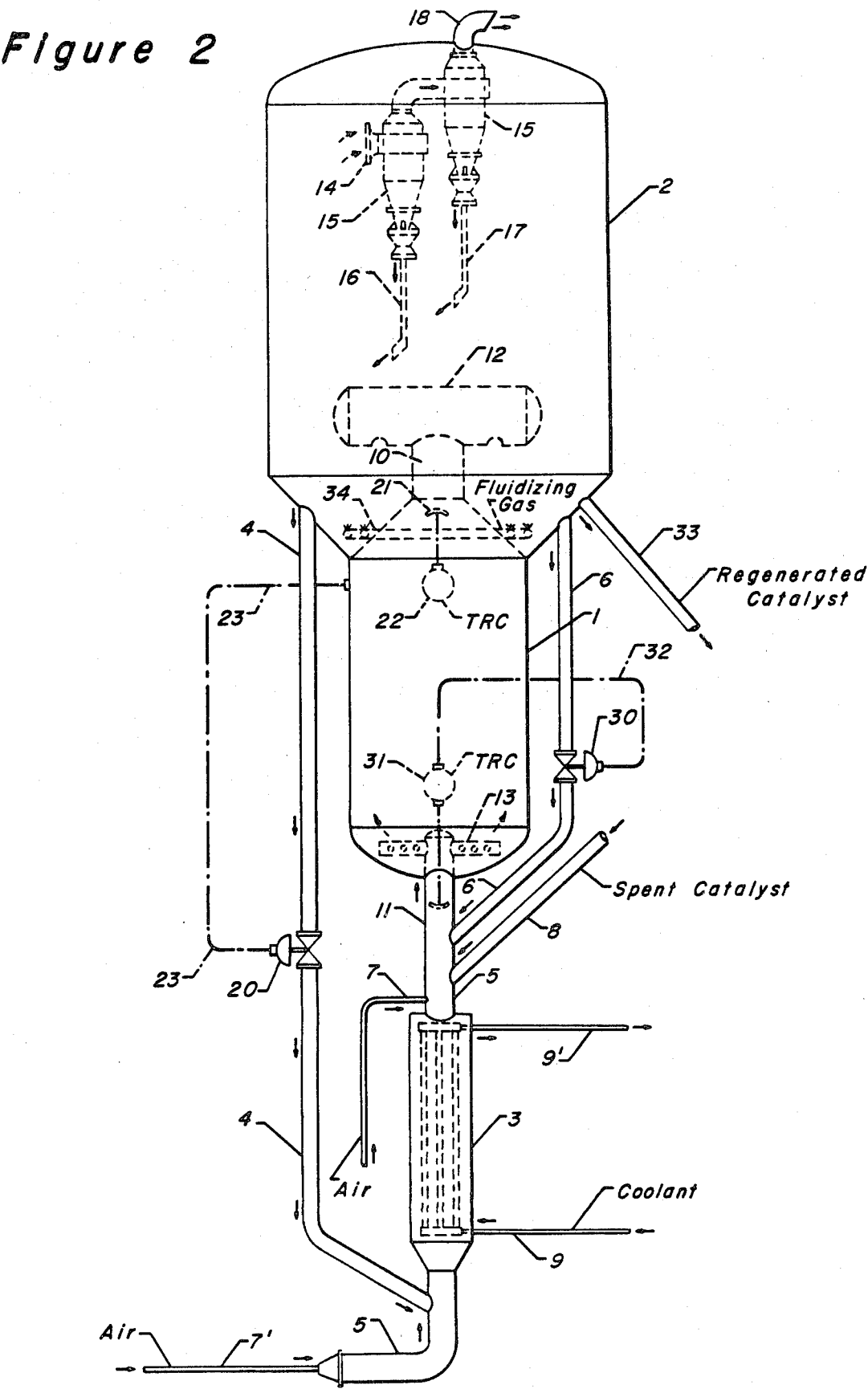
FIG. 2 is substantially the same as FIG. 1 except that the cooling zone shown illustrates the "rising system". Reference numerals of FIG. 2 which correspond to those of FIG. 1 indicate identical elements in the respective drawings, or elements having the same function.

Reference will now be made to the attached drawings for a discussion of the regeneration process and apparatus of the invention. In FIGS. 1 and 2 regeneration gas, which may be air or another oxygen containing gas, enters in line 7 (also conduit 7' in FIG. 2) and mixes with coke contaminated catalyst entering in conduit 8, hot regenerated catalyst entering in conduit 6 and cool regenerated catalyst entering in conduit 5. These streams all flow together into mixing conduit 11. The resultant mixture of coke contaminated catalyst, regenerated catalyst and regeneration gas are distributed into the interior of combustion zone 1, at a lower locus thereof, via conduit 11 and distributor 13. Coke contaminated catalyst commonly contains from about 0.1 to about 5 wt.% carbon, as coke. Coke is predominantly comprised of carbon, however, it can contain from about 5 to about 15 wt.% hydrogen, as well as sulfur and other materials. The regeneration gas and entrained catalyst flows upward from the lower part of combustion zone 1 to the upper part thereof in dilute phase. The term "dilute phase", as used herein shall mean a catalyst/gas mixture of less than about 25 lbs. per cubic foot, and "dense phase" shall mean such mixture equal to or more than 25 lbs. per cubic foot. As the catalyst/gas mixture ascends within combustion zone 1 the heat of combustion of coke is liberated and absorbed by the now relatively carbon free catalyst, in other words by the regenerated catalyst.

The rising catalyst/gas stream flows through passageway 10 and impinges upon surface 12, which impingement changes the direction of flow of the stream. It is well known in the art that impingement of a fluidized particulate stream upon a surface, causing the stream to turn through some angle, can result in the separation from the stream of a portion of the solid material therein. The impingement of the catalyst-gas stream upon surface 12 causes almost all of the hot regenerated catalyst flowing from the combustion zone to disengage from the flue gas and fall to the bottom portion of disengagement zone 2. The catalyst collection area of the disengagement zone may be a cone-shaped annular receptacle, as shown, or any other shape appropriate for collecting catalyst particles. The gaseous products of coke oxidation and excess regeneration gas, or flue gas, and the very small uncollected portion of hot regenerated catalyst flow up through disengagement zone 2 and enters separation means 15 through inlet 14.

These separation means may be cyclone separators, as schematically shown in the figures, or any other effective means for the separation of particulated catalyst from a gas stream. Catalyst separated from the flue gas falls to the bottom of disengagement zone 2 through conduits 16 and 17. The flue gas exits disengagement zone 2 via conduit 18, through which it may safely proceed to associated energy recovery systems. Having the disengagement zone in upward communication with the combustion zone is advantageous, in comparison to schemes in which the gas/catalyst mixture flows upward into a relatively dense phase heat removal zone, in that with the former, there is a substantial reduction in the loading of the regenerator cyclones which virtually eliminates large losses of catalyst from FCC units during operational upsets.

With reference to FIG. 1, in one embodiment of the present invention, a first portion of catalyst collected in the disengaging zone is passed in dense phase, via first catalyst recycle conduit 4, downwardly through cooling zone 3 which comprises a heat exchanger. First catalyst recycle conduit 4 connects to the top of heat exchanger 3. Heat exchanger 3 will most preferably comprise a shell and tube heat exchanger of vertical orientation with the heat transfer occurring from the catalyst, through the tube walls and into the heat transfer medium, e.g. water, passing through the heat exchanger via lines 9 and 9'. The catalyst may flow through either the shell or tube side. In the embodiment shown in the figures, the catalyst passes through the shell side of the heat exchanger and the heat exchange medium passes through the tube side. Control valve 20 is placed in heat exchanger catalyst discharge conduit 5. An associated control system will comprise means 21 to sense the temperature in an upper portion of combustion chamber 2, temperature control means 22 having an adjustable set point connecting with temperature sensing means 21 and developing an output signal, and means 23 for transmitting the output signal to control valve 20, whereby the latter may be adjusted responsive to the temperature at the upper portion of combustion zone 1, thereby regulating the flow of catalyst from the heat exchanger back to the combustion chamber. There may be additional catalyst flow control means which are not shown regulating catalyst flow to and from heat exchanger 3, such as means to control the amount of catalyst in the heat exchanger by controlling the flow of catalyst through a catalyst inlet valve upstream of the heat exchanger responsive to the pressure differential across the catalyst head in the heat exchanger.

Still referring to FIG. 1, the catalyst will flow from the bottom portion of heat exchanger 3, through heat exchanger catalyst discharge conduit 5, and into the lower portion of combustion chamber 1 via catalyst inlet conduit 11. The latter conduit, shown in vertical orientation, will also be the recipient of the spent catalyst from the reactor via conduit 8 and hereinafter discussed hot regenerated catalyst via conduit 6. The regeneration gas is also introduced into mixing conduit 11 via line 7 and serves to carry the catalyst mixture into ombustion chamber 1. The catalyst-regeneration gas mixture passes into the lower locus of the combustion zone via distributor 13. Of course, the equipment could also be oriented so that the regeneration gas and catalyst streams are directly added to the combustion chambers without the need for the mixing conduit. Hot regenerated catalyst is returned to the FCC reactor via conduit 33. Fluidizing gas may be added via lines 34 and 35 for this embodiment.

Referring now to FIG. 2, all process details are as in FIG. 1, except that the heat exchanger embodies a rising system rather than the falling system of FIG. 1. The above discussion concerning FIG. 1 applies to FIG. 2 except as hereinafter described. First catalyst recycle conduit 4 connects to the bottom of heat exchanger 3 and control valve 20 is placed in conduit 4 instead of in heat exchanger catalyst discharge conduit 5. Thus, in the embodiment shown in FIG. 2, the catalyst will flow into the bottom of the shell of heat exchanger 3 and be blown or carried upward in dilute phase through the shell by regeneration gas entering via line 7' which connects to the bottom of the shell. Heat exchanger discharge conduit 5 will in this embodiment also discharge into mixing inlet conduit 11, and the latter conduit will again be the recipient of the effluents of conduits 8 and 6, as well as line 7 from which the remaining portion of the required regeneration gas will be obtained.

It is essential to the invention for an amount of hot regenerated catalyst, i.e. a second portion, to be transported directly from disengagement zone 2 to mixing conduit 11. Second catalyst recycle conduit 6, which connects the bottom catalyst collection portion of the disengagement chamber with the mixing conduit, provides a means for such transportation. The temperature in the mixing conduit may be controllably maintained by controlling the quantity of the second catalyst portion transported through conduit 6 in response to the temperature at the lower locus. This control system could comprise control valve 30 placed in conduit 6, means to sense the temperature in mixing conduit 11, temperature control means 31 having an adjustable set point connecting with the temperature sensing means and developing an output signal, and means 32 for transmitting the output signal to the second control valve whereby the latter is adjusted responsive to the temperature in the mixing conduit, thereby regulating the flow of hot regenerated catalyst from the disengagement chamber to the mixing conduit.

The above scheme provides the ability to remove heat from the FCC regenerator as required to maintain a maximum combustion zone temperature and at the same time maintain a high regeneration gas-spent catalyst mixture temperature which is conducive to the initiation or "touching off" of the regeneration burning process and greater regeneration efficiency, all while enjoying the flexibility and ease of operation of an external catalyst cooler or heat exchanger (particularly the ability to not have to utilize cooling during start-up) and the efficiency of catalyst-flue gas separation achieved by a disengagement zone unencumbered by a dense catalyst phase and heat removing paraphernalia.

ILLUSTRATIVE EMBODIMENT

The following Illustrative Embodiment represents a particularly preferred mode contemplated for the practice of the invention, expressed in terms of the mass flow rates and temperatures of streams flowing in the regenerator depicted in the attached figures. The regenerator processes spent catalyst from a reaction zone which is cracking a reduced crude oil feedstock. In the tabulation below, the streams flowing within conduits are tabulated in registry with the item numbers of the conduits shown in FIG. 1.

| Stream | | lbs/hr | °F. |
|---|---|---|---|
| 8 | Coke Contaminated Catalyst (from reactor) | 2,724,552 | 1050 |
| | Catalyst | 2,691,362 | 1050 |
| | Coke | 30,902 | 1050 |
| 7 | (plus 7' in FIG. 2 Embodiment Regeneration Gas (air) | 463,530 | 307 |
| 33 | Hot Regenerated Catalyst from Upper Locus of Combustion Zone (to Reactor) | 2,691,362 | 1380 |
| 18 | Flue Gas | 493,302 | 1400 |
| 4 | Hot Regenerated Catalyst to Heat Removal Zone | 2,362,000 | 1380 |
| 5 | Recycled Cooler Regenerated Catalyst (to Mixing Zone) | 2,362,000 | 1150 |
| 6 | Recycled Hot Regenerated Catalyst (to Mixing Zone) | 1,675,000 | 1380 |
| 3 | Heat Removed by Heat Removal Means - $149.83 \times 10^6$ BTU/hr Heat Losses from Regenerator Vessel - $3.41 \times 10^6$ BTU/hr | | |

It should be noted that in this particular operation the feed stock to the reaction zone is a reduced crude oil, a material which yields a relatively high coke production. Such a high coke production, and the consequent, extraordinarily high evolution of heat in the combustion zone made necessary the recycle of 2,362,000 lbs./hr. of cooler regenerated catalyst from the heat removal zone to the combustion zone in order to limit the maximum combustion zone temperature to 1400° F.

The combination of streams 5 and 6 provides a combined catalyst recirculation stream with a temperature of 1245° F., to provide a high inlet temperature to the combustion zone.

What is claimed is:

1. An apparatus for regeneration of a coke-contaminated, fluid catalyst, which apparatus comprises:
   (a) a vertically oriented combustion chamber having an upper and lower section;
   (b) an inlet line for regeneration gas connecting with the lower section of said combustion chamber;
   (c) an inlet line for coke-contaminated, spent fluid catalyst connecting with the lower section of said combustion chamber;
   (d) a disengagement chamber located superadjacent to and above said combustion chamber and in direct communication therewith;
   (e) a catalyst collection portion at the bottom of said disengagement chamber;
   (f) a heat exchanger, located remote from said combustion chamber and said disengagement chamber, having a catalyst inlet and catalyst outlet;

(g) heat removal means disposed within said heat exchanger;

(h) a first catalyst recycle conduit connecting said bottom catalyst collection portion of said disengagement chamber with said heat exchanger inlet, such that hot regenerated catalyst passes from said catalyst collection portion of said disengagement chamber to said heat exchanger;

(i) a heat exchanger catalyst discharge conduit having a flow control valve therein, said conduit connecting said catalyst outlet of said heat exchanger with said combustion chamber, such that cooled catalyst from said heat exchanger passes from said heat exchanger to said combustion chamber;

(j) a second catalyst recycle conduit connecting said catalyst collection portion of said disengagement chamber with said combustion chamber, such that hot regenerated catalyst passes directly from said disengagement chamber to said combustion chamber; and (k) a control system to monitor and maintain the temperature within said combustion chamber which comprises:
  (i) first means to sense the temperature in the combustion chamber at a location within said upper section of said combustion chamber, such that said sensing is performed in a relatively dilute-phase of catalyst rising from a relatively dense-phase of catalyst maintained in said lower section of said combustion chamber;
  (ii) first means to control temperature having an adjustable set point and connecting directly with said first means to sense temperature and developing a first output signal; and
  (iii) first means for transmitting said first output signal to said control valve in said catalyst discharge conduit of step (i), such that said control valve in said discharge conduit is adjusted responsive to said temperature sensed within said upper section of said combustion chamber to regulate the flow of catalyst from said heat exchanger to said combustion chamber to increase or decrease the flow of cooled catalyst so as to maintain the desired temperature within said combustion chamber.

2. The apparatus of claim 1 wherein said heat exchanger comprises a shell and tube heat exchanger of vertical orientation with the catalyst to be cooled passing through the tubes and the heat exchange medium passing through the shell.

3. The apparatus of claim 1 wherein said heat exchanger comprises a shell and tube heat exchanger of vertical orientation with the catalyst to be cooled passing through the shell and the heat exchange medium passing through the tubes.

4. The apparatus of claim 1 wherein said first catalyst recycle conduit connects to the bottom of said heat exchanger, said heat exchanger catalyst discharge conduit connects to the top of said heat exchanger, and a conduit for gas connects to the bottom of said heat exchanger, such that catalyst is carried upwardly through said heat exchanger by said gas.

5. The apparatus of claim 1 wherein there is a mixing conduit for gas and fluid catalyst connecting the lower section of said combustion chamber with said heat exchanger discharge conduit, said second catalyst recycle conduit, said spent catalyst inlet, and said regeneration gas inlet line, such that said controlled flow of said cool regenerated catalyst, said hot regenerated catalyst, said spent catalyst and said regeneration gas are first mixed in said mixing conduit prior to being introduced into said lower section of said combustion chamber.

6. The apparatus of claim 5 wherein there is included a second control valve placed in said second catalyst recycle conduit, and said control system further comrises second means to sense the temperature in said mixing conduit, second temperature control means having an adjustable set point connecting with said second temperature sensing means and developing a second output signal, and second means for transmitting said output signal to said second control valve whereby the latter is adjusted responsive to said temperature in said mixing conduit, thereby regulating the flow of hot regenerated catalyst from said disengagement chamber to said mixing conduit.

* * * * *